(No Model.)
J. BAYNES.
PHOTOGRAPHIC APPARATUS.
No. 365,897. Patented July 5, 1887.
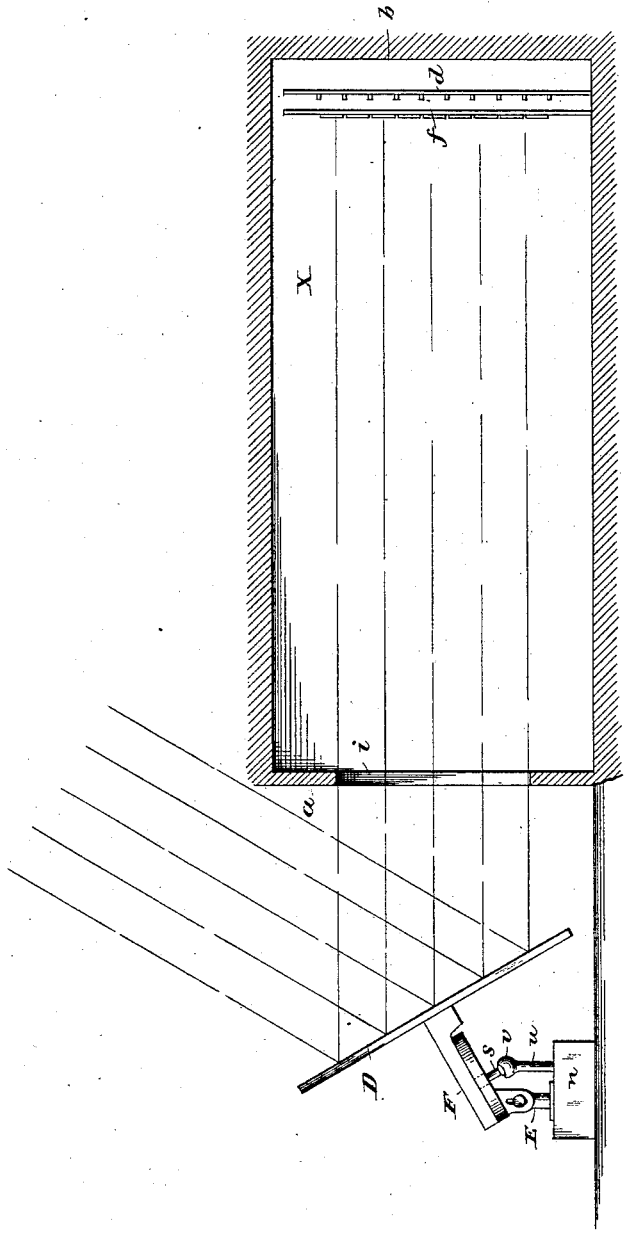

UNITED STATES PATENT OFFICE.

JOHN BAYNES, OF BRONXDALE, ASSIGNOR OF ONE-FOURTH TO LOCKWOOD DE FOREST, OF OYSTER BAY, NEW YORK.

PHOTOGRAPHIC APPARATUS.

SPECIFICATION forming part of Letters Patent No. 365,897, dated July 5, 1887.

Application filed December 31, 1885. Serial No. 187,228. (No model.)

*To all whom it may concern:*

Be it known that I, JOHN BAYNES, a subject of the Queen of Great Britain, residing at Bronxdale, in the county of Westchester and State of New York, have invented certain new and useful Improvements in Photographic Apparatus, of which the following is a specification.

My invention has for its object to facilitate the printing of objects by the action of light-rays directed through suitable negatives or pattern-plates adapted for use in printing on paper and other like materials, but especially intended for use in printing plaques, or in operating upon the prepared surfaces of objects of irregular character which cannot be brought at all points in direct contact with the pattern-plates; and this object I attain by arranging a mirror to receive the direct rays of light and to transmit parallel rays through the pattern-plates arranged in a suitable chamber at right angles to said rays, and in moving said mirror to maintain it in a fixed relation to the sun's rays.

One mode of carrying out my invention is illustrated in the accompanying drawing, in which the figure represents in sectional elevation a chamber, means for supporting the pattern-plates and objects, and a mirror and actuating mechanism.

X represents a room or chamber, in the front wall, $a$, of which is an opening, $i$, for the passage of the light-rays, and within which, either upon the rear wall, $b$, or upon a suitable support, $d$, are secured the objects to be acted upon by the light and the pattern-plates or negatives through which the light passes to said objects.

In the drawing a support or frame $d$ is shown as arranged parallel to the rear wall, to hold the objects to be acted upon—as, for instance, watch-cases, plaques, tiles, or other objects of such a form as will not permit the direct contact of the entire surfaces with the pattern-plates; and a frame, $f$, is shown arranged in front of the frame $d$, the said frame $f$ being of such construction as to support the various pattern-plates or negatives. Inasmuch as the objects are separated from the pattern-plates, it is essential for the production of sharp impressions that the rays of light be directed and maintained at right angles to and through the pattern-plates. I therefore arrange outside of the opening $i$ a mirror, D, at such an angle as to receive the direct rays of the sun and reflect them through the opening and through the pattern-plates at right angles to the latter. As the apparent movement of the sun in relation to a fixed mirror would result in varying the angle of the light-rays thrown through the pattern-plates, I provide means for continuously moving the mirror D, so as to avoid this effect. Thus I support the mirror by a standard, E, having an inclined face adapted to an inclined face upon the bracket F, secured to the mirror, the inclination of the faces being such that when the bracket is moved upon the standard in accord with the apparent movement of the sun the mirror will be maintained in fixed relation to the latter, and there will be no variation in the angle at which the sun's rays are thrown through the pattern-plates.

In connection with the guided mirror I make use of a spring or other motor, $u$, a shaft, $u$, of which is connected with the pivot $s$ of the bracket F by a universal joint, $v$, so that as the shaft $u$ revolves the mirror will be moved in unison with the apparent movement of the sun. By the means above described I am enabled to direct through the opening $i$ a large volume of light-rays parallel to each other and at right angles to the faces of pattern-plates, covering an extensive surface, so that a large number of plates may be printed simultaneously, while the sides or wall of the apartment effectually exclude all secondary rays, so that prints having extremely sharp outlines are secured, notwithstanding the separation of the pattern-plates and the objects.

I have indicated an apparatus for moving the mirror without showing the details thereof, which do not need special illustration, as they are well known to all makers of astronomical instruments. I, however, do not limit myself to any special mechanism for guiding and moving the mirror to maintain it in fixed relation to the sun, as many various different means may be employed for this purpose. In some cases the entire forward end of the apartment X may be removed and a mirror of such size may be employed as will direct the mass of parallel rays through the entire apartment, so as to operate upon objects covering or in front of the entire rear wall.

I make no claim herein to subject-matter shown and described but not specifically claimed, as such subject-matter forms the basis of and is claimed in another pending application, Serial No. 187,459.

Without limiting myself to the precise construction and arrangement of parts shown, I claim—

The combination, with an apartment containing supports for pattern-plates and objects to be operated on by light-rays, of a mirror arranged to receive the direct rays of the sun and to reflect them in parallel lines through the pattern-plates, a support for holding and guiding the mirror, and a motor for moving the mirror to maintain it in fixed relation to the sun's rays, substantially as specified.

In testimony whereof I have signed my name to this specification in the presence of two subscribing witnesses.

JOHN BAYNES.

Witnesses:
  GEO. H. LORRERRE,
  FREDERIC SHONNARD.